April 8, 1969   R. K. RICHARDS   3,437,846
CRYOTRON
Original Filed May 23, 1957

INVENTOR.
Richard K. Richards
BY Norman C. Hulmer
Att'y.

United States Patent Office

3,437,846
Patented Apr. 8, 1969

3,437,846
CRYOTRON
Richard K. Richards, 1821 Allen Ave.,
Ames, Iowa 50010
Continuation of application Ser. No. 661,143, May 23,
1957. This application June 14, 1963, Ser. No. 288,860
Int. Cl. H03k 3/38, 15/24, 17/00
U.S. Cl. 307—306                                  33 Claims This application is a continuation of application Ser. No. 254,852 filed Jan. 17, 1963, which was a continuation of application Ser. No. 149,806 filed Oct. 23, 1961, which was a continuation of application Ser. No. 661,143 filed May 23, 1957.

This invention relates to a low-temperature device which is useful as a digital computer component and of the type known as a cryotron, which utilizes the superconductive phenomenon exhibited by some materials at low temperatures. More particularly, the invention relates to improvements in the structure of cryotron devices.

A cryotron is a relatively new type of computer component and is described in some detail in a paper by D. A. Buck in the April 1956 issue of the Proceedings of the Institute of Radio Engineers, on pp. 482–493. The basic function of a cryotron device is to control the flow of current in one part of the device by means of the application of a signal to another part of the device. This function is achieved through the fact that a conductor in the extremely low-resistance or superconductive condition can be caused to change to the normal resistance condition by the application of a magnetic field to the conductor. Although the cryotron requires that the system be refrigerated to a very low temperature, there are many potential advantages in the use of cryotron in digital computers, as compared with vacuum tubes, transistors, and other more conventional components. These potential advantages include very low power consumption, light weight, small size, low cost, and high speed.

In the prior art, the scheme which has been used to generate the magnetic field has been to wind one wire in the form of a helical coil around a straight wire. With this arrangement the straight wire can selectively be caused to be either in the superconducting or in the normal resistance condition. The magnetic field is produced by passing a current through the helical-shaped winding around the straight wire, and the magnetic flux lines are parallel to the axis of the straight wire. The straight wire and the winding constitute the cryotron. This configuration for a cryotron has several disadvantages. For one thing, although the wrapping of one wire around another is easily accomplished with relatively large wire diameters, this operation is quite difficult with the very fine wire sizes which are desirable in the interests of small size and high speed of operation. Also, the resulting structure is delicate and easily damaged. A disadvantage from the standpoint of its use in circuits is created as a result of the inductance of the helical winding. This inductance limits the speed of operation, whereas high speeds are usually desirable when the component is used in a digital computer. Another electrical disadvantage of the previously known cryotron is in the limited current amplification available. Since current in the straight wire as well as current in the winding creates a magnetic field, the amount of current that can be passed through the straight wire without this current causing an undesirable transition from the superconducting to the normal-resistance condition is limited, and the ratio between this current limit and the current in the helical winding necessary to produce the transition is called the current amplification factor.

An object of this invention is to provide a cryotron structure which is easily fabricated.

Another object is to provide a cryotron structure which is rugged.

Still another object is to provide a cryotron structure which achieves a high speed of operation by minimizing the inductance in the elements of the device.

A further object is to provide a cryotron structure which yields a high current amplification factor. Still other objects will be apparent.

In the preferred embodiments of this invention the elements are in the form of concentric cylinders although as hereinafter pointed out other forms can be used. The novel features and advantages of this invention are also derived from the manner in which currents are passed through the various elements. Some embodiments of the invention are obtained through the use of additional elements which are preferably in the form of additional concentric cylinders.

The contemplated mode of fabrication of the new device involves the building-up of successive layers of the desired materials on a central wire; this building-up is readily accomplished by electroplating, evaporating, spraying, dipping, or other processes.

The principles of the invention and the modes of operation for achieving the above-named objects are fully disclosed in the following description and claims and are illustrated in the figures of the drawing, which disclose by way of examples the preferred embodiments of the invention and the best modes which have been contemplated for carrying out these embodiments.

When certain materials are cooled to a very low temperature, it is found that they exhibit very low resistance properties. Further, it is found with these materials that as the temperature is lowered, a discontinuous transition occurs at which the resistance suddenly changes from what might be called a normal-resistance value to a value which is exactly zero within the limits of presently available measuring techniques. When the resistance is exactly zero the material is said to be in the superconducting condition, and materials which exhibit this phenomenon are called superconductors. The temperature of transition between the normal-resistance state and the superconducting state is different for different superconductors, but in all instances is very low and for many of the superconductors this temperature is in the range of 2° K. to 15° K.

From the standpoint of the functioning of a cryotron, the important feature of the superconductive phenomenon is that the temperature of transition is a function of the intensity of the magnetic field in the region of the material. The temperature of transition decreases as the intensity of the magnetic field is increased. This relationship is illustrated in a qualitative manner for a typical superconductor in FIG. 1, in which the curve 11 shows a typical transition magnetic field intensity as a function of temperature. This graph may be interpreted in the following manner. If the material is at a given temperature and if a magnetic field of a given intensity is maintained in the region of the material, the temperature and field can be represented by a point on the plane of the graph. If this point falls in the region inside the curve 11, the material is in the superconducting condition. If the point falls in the region outside of the curve 11, the material is in the normal-resistance condition. These two regions are indicated in FIG. 1.

Figure 1:
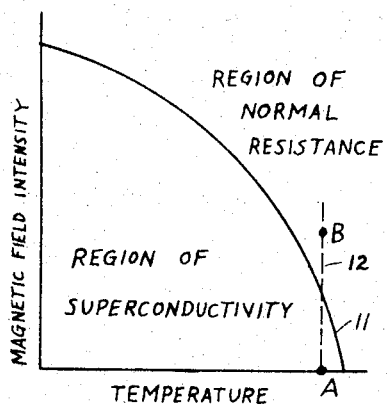
FIG. 1 is a graph showing the magnetic field intensity needed to produce a transition from the superconducting condition to the normal-resistance condition, as a function of temperature, for a typical superconductive material.

If the temperature of the material is maintained slightly less than the transition temperature for zero applied magnetic field, as shown at point A in FIG. 1, the material will be in the superconducting condition, and it can be carried out of this condition and into the normal-resistance condition, as shown at point B, by the application of a relatively low-intensity magnetic field. This action is indicated by the vertical dotted line 12 in FIG. 1. When the applied magnetic field is removed, the material will return to the superconductive condition.

In the cryotron device in accordance with this invention, three different types of materials are employed. The first of these materials has a zero-field transition temperature that is slightly higher than the operating temperature of the device. A relatively small magnetic field applied to this material is capable of causing the point of operation to be shifted from the region of superconductivity (point A in FIG. 1) to the region of normal-resistance (point B in FIG. 1) as indicated by the dotted line 12. When the magnetic field is removed the material returns to the superconductive condition. The second of the three types of materials has a transition temperature that is substantially higher than the operating temperature at all values of the magnetic field intensity to be experienced by the elements of the device in the course of its operation. In other words, this material remains a superconductor at all times. The third type of material is an insulator. In some applications it would be satisfactory to replace the insulating material with a conductor made of a material which does not exhibit the superconductive phenomenon under any conditions of operation of the device. This substitution can be made because the circuits in which cryotron devices are used can be arranged to provide alternate current paths, a zero-resistance path being open to the flow of current at all times, and therefore any resistance at all in the other paths has the effect of completely eliminating the flow of current therethrough.

For operation at 4.2° K., satisfactory materials for the three types mentioned in the previous paragraph are tantalum, niobium, and enamel, respectively. A possible substitution for enamel is aluminum, the transition temperature for which is well below 4.2° K. The device of this invention is not limited to the use of these materials, however, and other materials and operating temperatures can be chosen without affecting the principles of the invention.

In the various figures of the drawing, similarly numbered elements have similar functions.

Figure 2:
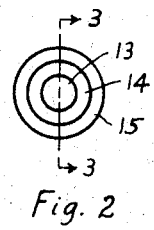
FIG. 2 is an end view of a preferred embodiment of the invention.
Figure 3:
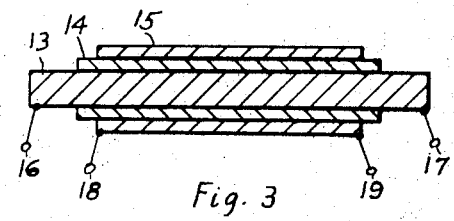
FIG. 3 is a longitudinal cross-section view of FIG. 2 taken on the line 3—3 thereof.

FIGS. 2 and 3 show an embodiment of the invention which consists of three concentrically arranged members of substantially circular cylindrical shape. An inner conductive element 13 is a wire preferably made of a material which remains a superconductor under the conditions of operation. A portion of this wire is concentrically covered with a thin layer 14 of insulating material. A portion of the surface of this insulating material is covered with a concentric layer 15 of material which is a superconductor at the operating temperature of the device but can be shifted to the normal-resistance condition by the application of a magnetic field of relatively small intensity. Thus, the device comprises, essentially, an inner elongated conductive element 13 which is substantially surrounded by a coaxially arranged hollow cylindrical outer conductive element 15, these elements being separated by an insulator 14, and the outer element 15 having the characteristic of becoming superconductive under the control of a magnetic field produced by the inner element 13.

Electrical connections are made at the ends of the inner element 13 and at the ends of the outer element 15. These connections are shown in FIG. 3 in symbolic form by single lines to terminals 16, 17, 18, and 19, respectively. The applied currents are fed to these pairs of terminals. Actually, the size of the lead wires connecting the elements of the device to the terminals may be of larger diameter than the elements of the device. In most applications, at least a part of these lead wires would be made of a material that remains a superconductor under all conditions of operation. For many applications of the invention, the nature of these connections is immaterial. The foregoing remarks also apply to the lead wires and connecting wires to be described in connection with other embodiments of the invention.

In the operation of the device of FIGS. 2 and 3, the current to be controlled is passed from terminal 18 through the outer element 15 to terminal 19. It may be assumed, for purposes of illustration, that the flow lines for current are straight and axial along the cylinder formed by element 15. The controlling current is passed from terminal 16 through element 13 to terminal 17. If the current through this circuit is sufficiently great, the resulting magnetic field intensity at the outer element 15 will be sufficiently great to cause the material of this element to change into the normal-resistance condition. The changing resistance of element 15 will, of course, affect the flow of current therein, and hence the device may be used as a switch.

The current through the outer element 15 will create a magnetic field at the surface of this element in substantially the same manner as does current through the inner element 13. For a long straight wire of circular cross-section, the field intensity at a distance $r$ from the axis is proportional to $I/r$ where $I$ is current amplitude. This relationship is correct whether the wire is solid or hollow. Therefore, the magnetic field intensity at the outer surface of outer element 15 will be the same for a given current amplitude whether this current is flowing through inner element 13 or outer element 15, except for minor differences resulting from the finite lengths of the elements. This fact implies that if a current magnitude of $I_0$ in element 13 is the minimum that is sufficient to cause a transition of the outer element 15 into the normal-resistance condition, the maximum current that can be passed through outer element 15 without causing this transition is slightly less than $I_0$. In other words, the current amplification factor is slightly less than unity. The magnetic fields which are produced are concentric about, and at right angles to, the axes of the elements 13 and 15.

Because of the symmetry of the device of FIGS. 2 and 3, the direction of current flow in either of the elements 13 or 15 is immaterial when current is flowing in only one of these elements. However, the relative directions of current flow when currents are flowing in both elements simultaneously is of importance. Specifically, when the two currents are flowing in the same direction, left to right, for example, the magnetic field intensities add so that the net field intensity at the outer element 15 is the sum of the intensities as produced by the two currents.

This mode of operation is useful in applications where a current to be controlled is initially flowing in element 15 and a resistance is to be inserted in this path. When the controlling current is passed through the inner element 13 in the same direction as the current through the outer element 15, less current in 13 is required to cause the transition of element 15 to the normal-resistance condition than would be the case if the currents were in the opposite directions or if the current directions were of no consequence.

On the other hand, there are applications where the mode of operation involving current in opposite directions is useful. For example, if a bias current of slightly less than $I_0$ is maintained in element 13, a current of nearly $2I_0$ can be passed in the opposite direction through element 15 without causing a transition into the normal-resistance condition. This result is possible because the net field intensity at element 15 will be equal to the difference in field intensities produced by the two currents separately. Then when the bias current is removed, the current in element 15 will cause the transition. This mode of operation can be extended to handle even larger currents by increasing the currents in elements 13 and 15 simultaneously in such a manner that the net field intensity from the two opposite-direction currents is less than the value which produces the transition in element 15. Then termination or reduction of the current in either of the elements 13 or 15 will produce the transition.

Current amplification properties can be improved by using two or more units of the type shown in FIGS. 2 and 3. The number 13 elements of the several devices are connected in series and the number 15 elements are connected in parallel. If the connections to the number 15 elements are arranged so that the inductances in the leads of the several branches of the parallel connection are substantially equal, the controlled current will be divided equally among the branches. The controlling current in the number 13 elements will affect all units in the same manner so that the net current amplification factor is the sum of the amplification factors obtained from the units individually.

Figure 4:
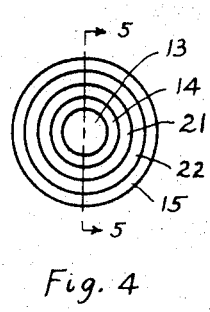
FIG. 4 is an end view of another preferred embodiment of the invention.
Figure 5:
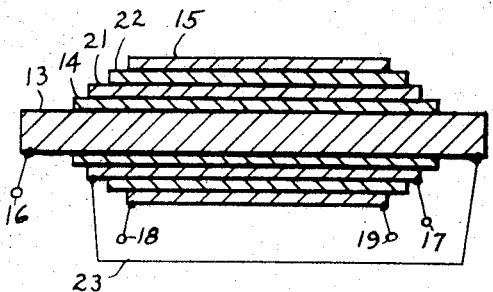
FIG. 5 is a longitudinal cross-sectional view of FIG. 4 taken on the line 5—5 thereof, and shows electrical connections to elements of the device.

The device shown in FIGS. 4 and 5 is an elaboration of the device of FIGS. 2 and 3, in that additional cylindrical elements 21 and 22 have been added. Element 21 in these figures is a cylindrical conductor that remains in the superconductive condition at all times. Element 22 is an insulator between elements 15 and 21. One end of the inner element 13 is connected to the opposite end of element 21 by a connection wire 23. With this arrangement, the controlling current is passed from terminal 16 through element 13, through wire 23, and then through element 21 to terminal 17. The effect of the arrangement is to pass the controlling current twice through the center of the controlled element 15 so that, for a given amount of controlling current, twice the magnetic field intensity is created at element 15. Therefore, the ratio of the controlled current for producing transition to the controlling current for producing transition is twice as great as with the arrangement of FIGS. 2 and 3. The fact that the radius of element 15 is increased as a result of the added elements, the other dimensions being assumed to be unchanged, has the effect of causing larger values of currents to be required, but the ratio of currents is not altered by the radius dimensions. Also, the actual dimensions are not affected as much as indicated in the figures, which are drawn for purposes of illustration and are not necessarily scale indications of dimension that would be used. In practice, the thickness of elements 14, 15, 21, and 22 would be small compared with the diameter of the inner element 13.

More layers can be added to provide for three or more passages of controlling current through the conductor carrying the controlled current.

Figure 6:
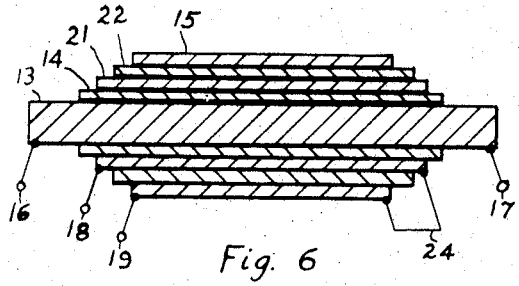
FIG. 6 is the same longitudinal cross-sectional view as FIG. 5, and shows alternative electrical connections to elements of the device.

The device shown in FIG. 6 is the same physical arrangement as the device of FIGS. 4 and 5, the connections being different. With this arrangement, the controlling current is passed from terminal 16 through element 13 to terminal 17, as in FIG. 3. One end of element 21 is connected to the corresponding end of element 15 by a connecting wire 24. The controlled current is passed from terminal 18 through element 21, through wire 24, and through element 15 to terminal 19. Since the controlled current flows in opposite directions through elements 21 and 15, the net magnetic field intensity at element 15 as a result of current in this circuit is substantially zero, and therefore a controlled current of large magnitude can be passed without causing a transition of element 15 to the normal-resistance condition. Nevertheless, a controlling current of $I_0$ in the inner element 13 is still sufficient to cause the transition.

Figure 7:
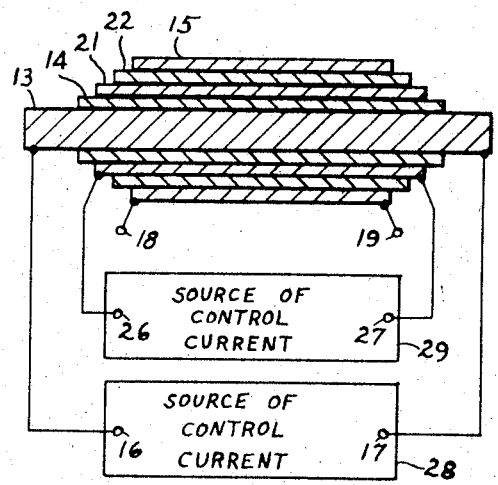
FIG. 7 is the same longitudinal cross-sectional view as FIG. 5, and shows an alternative circuit arrangement connected to elements of the device.

A modification of the invention can be obtained by providing separate pairs of terminals for elements 13 and 21, as shown in FIG. 7. The terminals for element 21 are designated by the numerals 26 and 27. Sources of control current 28 and 29 are connected across the terminals 16–17 and 26–27, respectively. In this arrangement, separate and independent control currents can be passed through the two elements 13 and 21 so that the resistance of the outer element 15 can be controlled in any of several different ways through the action of two independent input signals. Specifically, the currents in elements 13 and 21 can be passed in the same direction with respect to each other so that the transition in the outer element 15 can be effected by current in one or the other of elements 13 and 21, or, by using a smaller amplitude of controlling current, the transition can be made to take place only when currents are present in both of these elements. These currents can be made to flow in the same or opposite directions with respect to the controlled current in the outer element 15, and features similar to those previously described can be obtained. By passing current in opposite directions with respect to each other in elements 13 and 21, the transition to the normal-resistance condition in element 15 can be made to take place when one or the other, but not both, of the controlling currents is present.

By adding more concentric elements, the features described in the previous paragraph can be combined with the features of either or both of the arrangements of FIGS. 5 and 6.

Figure 8:
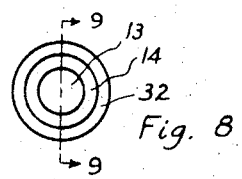
FIG. 8 is an end view of a modification of the device in accordance with the invention.
Figure 9:
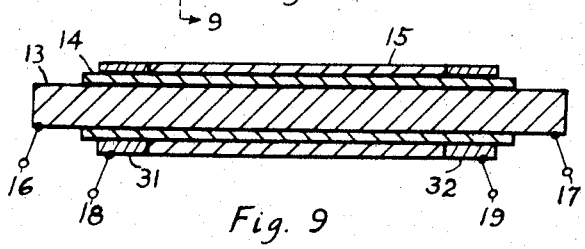
FIG. 9 is a longitudinal cross-sectional view of FIG. 8 taken on the line 9—9 thereof.

In some applications, point-connections of the terminals and lead wires to the various elements may prove undesirable, in which case the inclusion of a collar made of a superconducting material at each connection may be desirable to cause a better current distribution in the active elements of the device. The geometry of such collars at the connections to element 15 is illustrated in FIGS. 8 and 9. The connecting collars are designated by 31 and 32. Since the current in a superconducting path tends to be distributed in inverse proportion to the inductance in the various parallel branches of the path, the collars will desirably allow the current to be evenly distributed around the circumference of element 15 as it flows from one end of this element to the other. The purpose of this current distribution is to prevent high local magnetic field intensities at parts of element 15 as a result of concentrated currents which might be caused by point connections to this element.

Other variations of the invention can be realized by using two or more concentric controlled elements of the type of element 15. If a controlling current is passed through an element corresponding to inner element 13, the resistance of all of the 15-type elements can be controlled simultaneously. Further, the current in the 13-type elements of a relatively small radius can be used in the control of the resistance of the 15-type elements of larger radius.

In all of the preferred embodiments of this invention, the conductive elements are substantially straight wires or cylinders which have a relatively low inductance. This low inductance is advantageous because it offers a very low impedance to changes in the flow of current, so that relatively high operating speeds are possible. However, the conductive elements could be bent to form a curved configuration if such a change were desirable in certain situations. By making the wall of outer element 15 very thin, its resistance in the normal-resistance condition will be relatively high, which is of value in the design of high speed circuits.

For reasons of economy, ease of manufacture, durability, and efficient operation, the device in accordance with the invention preferably is constructed in the form of concentric cylindrical conductors as has been described above. However, since the current is not required to flow circumferentially in the cylindrical conductors, one or more slits may be provided lengthwise in the walls of these cylinders. A plurality of such slits will separate a cylindrical conductor into a plurality of parallel conductors to the ends of which separate electrical connections can be made, thereby providing a plurality of controlled or controlling elements arranged in a parallel manner. These sectional elements can be connected together in series or in parallel, or can be connected individually to separate circuits. If the outer cylindrical element 15 of FIGS. 2 and 3 is provided with a lengthwise slit which is wide enough to extend most of the distance around the circumference of element 15, then element 15 will be reduced to the equivalent of an elongated conductor positioned close to, and parallel to, the element 13. In this arrangement, current in the controlling element 13 will cause a magnetic field to occur in the wire-like controlled element 15 at right-angles to the axis thereof, and the conductivity condition of element 15 can thus be controlled in the manner described above with respect to a cylindrical element 15.

Figure 10:
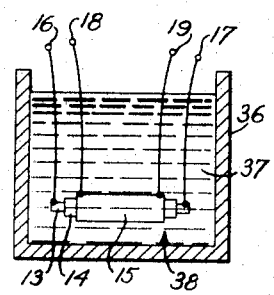
FIG. 10 is a cross-sectional view of a suitable means for maintaining the device at a desired operating temperature.

FIG. 10 illustrates one way of maintaining the above-described devices at a suitable operating temperature. A vessel 36, shown in cross-sectional view, contains a medium 37 which is at the desired temperature. A suitable medium 37 is liquid helium. Any of the devices described above is immersed in the medium 37, as indicated at 38.

It has been shown by way of examples how elements made of materials exhibiting superconductive properties can be assembled to provide a new device for the control of the flow of current in one part of the device through the action of a current in another part of the device. It is to be understood that the above-described embodiments are illustrative of the applications of the principles of this invention, and other embodiments and modified combinations of the arrangements shown can be devised by those skilled in the art without departing from the spirit and scope of this invention as defined in the claims.

What is claimed is:

1. A cryotron device comprising at least three concentrically arranged electrically conductive elements, the outermost of said elements being made from a material having superconductive characteristics whereby said outermost element has two conductive states which can be controlled by a magnetic field, means connected to apply a control current through the innermost of said elements thereby to create a magnetic field for controlling the conductivity of said outermost element, means connected to apply a current to be controlled through said outermost element, and means connected to apply a current through an intermediate one of said elements.

2. A cryotron device comprising at least three concentrically arranged electrically conductive elements, the outermost of said elements being made from a material having superconductive characteristics whereby said outermost element has two conductive states which can be controlled by a magnetic field, means connected to apply a control current through the innermost of said elements thereby to create a magnetic field for controlling the conductivity of said outermost element, means connected to apply a current to be controlled through said outermost element, and means connected to apply a current through an intermediate one of said elements, and in which device said innermost element and said intermediate element are connected in series whereby said control current passes through both of said series-connected elements.

3. A device as claimed in claim 2, in which said innermost element and said intermediate element are electrically connected together at opposite ends thereof, whereby said control current flows in the same direction through both of said series-connected elements.

4. A device as claimed in claim 1, in which said outermost element and said intermediate element are connected in series whereby said current to be controlled passes through both of said series-connected elements.

5. A device as claimed in claim 4, in which said outermost element and said intermediate element are electrically connected together at corresponding ends thereof, whereby said current to be controlled flows in relatively opposite directions through said series-connected elements.

6. A cryotron device comprising at least three concentrically arranged electrically conductive elements, the outermost of said elements being made from a material having superconductive characteristics whereby said outermost element has two conductive states which can be controlled by a magnetic field, means connected to apply a control current through the innermost of said elements thereby to create a magnetic field for controlling the conductivity of said outermost element, means connected to apply a current to be controlled through said outermost element, and means connected to apply a current through an intermediate one of said elements, and in which device said means to apply a current through said intermediate element comprises an independent source of control current connected to said intermediate element thereby to create a second magnetic field for controlling the conductivity of said outermost element.

7. A device as claimed in claim 6, in which said control currents are polarized to flow in the same direction through said innermost intermediate elements, the magnitudes of said control currents being chosen so that the presence of both of said control currents causes said outermost element to assume one of said conductive states and the absence of at least one of said control currents causes said outermost element to assume the other of said conductive states.

8. A device as claimed in claim 6, in which said control currents are polarized to flow in opposite directions through said innermost and intermediate elements, the magnitudes of said control currents being chosen so that the presence of both of said control currents causes said outermost element to assume one of said conductive states and the presence of one only of said control currents causes said outermost element to assume the other of said conductive states.

9. A cryotron device comprising at least three electrically conductive elements arranged mutually parallel, at least a first one of said elements being made from a material having superconductive characteristics whereby it has two conductive states which can be controlled by a magnetic field, means connecting said first element electrically in series with a second one of said elements, and means connected to apply a variable control current in a third of said elements thereby to control the conductivity of said series-connected first and second elements.

10. A device as claimed in claim 9, in which said series-connected first and second elements are electrically connected together at corresponding ends thereof, whereby any current flowing therein will flow in relatively opposite directions through said first and second elements.

11. A cryotron device comprising at least three electrically conductive elements, at least a first one of said elements being made from a material having superconductive characteristics whereby it has two conductive states which can be controlled by a magnetic field, said first element and a second one of said elements being arranged mutually parallel and connected electrically in series, a third one of said elements being arranged so that a current therein can create a magnetic field for controlling the conductivity of said series-connected first and second elements, and means connected to apply a variable control current in said third element thereby to control the conductivity of said series-connected first and second elements.

12. A device as claimed in claim 11, in which said series-connected first and second elements are electrically connected together at corresponding ends thereof, whereby any current flowing therein flows in relatively opposite directions through said first and second elements.

13. A cryotron device comprising at least three concentrically arranged electrically conductive elements, at least the outermost of said elements being made from a material having superconductive characteristics whereby it has two conductive states which can be controlled by a magnetic field, and means connecting said outermost element electrically in series with another of said elements to form a series combination, whereby a variable current in a further one of said elements can create a magnetic field for controlling the conductivity of said series combination.

14. A device as claimed in claim 13, in which said series-connected elements are electrically connected together at corresponding ends thereof, whereby any current flowing therein flows in relatively opposite directions through said series-connected elements.

15. A cryotron device comprising a controlled element made from a material having superconductive characteristics which can be affected by a magnetic field, first terminal means connected to said controlled element to establish a path for a controlled current in said controlled element between said first terminal means, a controlling element positioned to apply a magnetic control field at said controlled element in the region of said controlled current path thereby to control the conductivity of said controlled element in the region of said controlled current path, second terminal means connected to said controlling element to establish a path for the controlling current in said controlling element, and means responsive to current in and cooperating with said controlled element for causing the net magnetic field at said controlled element in the region of said controlled current path to be different from the magnetic field which would be produced from the joint action of the said controlled and controlling currents independently of said cooperating means, said cooperating means comprising an electrically conductive element conducting a current that is proportional to the current in said controlled element, and said electrically conductive element being positioned parallel to and in magnetic proximity to said controlled element whereby said current in said electrically conductive element flows in a path substantially parallel to said path of controlled current flow in said controlled element to apply a magnetic control field to said controlled element.

16. A cryotron device comprising a pair of elongated electrically conductive elements positioned in a mutually parallel relationship and in proximity to be mutually magnetically related, a first one of said elements being made from a material having superconductive characteristics which can be affected by a magnetic field for controlling a conducted current in said first element, means to apply a control current through the second of said elements thereby to create a magnetic field for controlling the conductivity of and the current in said first element, and means responsive to said controlled current in the first of said elements for creating a magnetic field effect to supplement that of said control current in said second element and serving thereby to produce a current gain greater than one in the operation of the device.

17. A cryotron device comprised of a plurality of individual cryotrons each having a controlled element and a controlling element where each said controlled element has superconductive characteristics that can be destroyed by the magnetic field generated by a current in the corresponding said controlling element and with the controlled elements of said individual cyrotrons connected in parallel and the controlling elements of said individual cryotrons connected in series.

18. A cryotron comprising a controlled element made of a material having superconductive characteristics which can be destroyed by a magnetic field of sufficient intensity, a controlling element which is made of a different superconductive material that, for a given temperature, requires a higher magnetic field intensity for the destruction of superconductive characteristics than is required for said material of said controlled element, means for passing current in said controlled and controlling elements in mutually parallel directions and with said controlled and controlling elements so shaped and positioned relative to each other that a current of suitable amplitude in said controlling element will cause the superconductive characteristics of said controlled element to be destroyed but will not destroy the superconductive characteristics of said controlling element.

19. A circuit element including the combination of a control wire constructed of a first material which is superconductive for current flow therethrough up to a critical current value, a tubular conductor coaxially disposed with respect to the control wire and constructed of a second material which is capable of being switched between a superconductive and resistive state in response to a magnetic field surrounding the control wire, said control wire and said tubular conductor exhibiting different values of critical magnetic field at which they may be switched between superconductive and normally resistive states at a given temperature, and means for varying the current flow through the control wire over a range of values less than said critical current value to vary the surrounding magnetic field whereby the tubular conductor is selectively switched between a superconductive state and a resistive state.

20. A circuit element including the combination of a central control wire constructed of a first material which is superconductive for current flow therethrough up to a critical current value, a tubular conductor coaxially disposed with respect to the control wire and constructed of a second superconductive material, said control wire and said tubular conductor exhibiting different values of critical magnetic field for which they may be switched between superconductive and resistive states at a given operating temperature, means disposed between the control wire and the tubular conductor for insulating the tubular conductor from the control wire at the operating temperature of the circuit element, and means for varying the current flow through the control wire over a range less than said critical current value to vary the surrounding magnetic field whereby the tubular conductor is selectively switched between a superconductive state and a resistive state.

21. A circuit element including the combination of at least one inner conductor, at least one outer conductor which is coaxially disposed with respect to the inner conductor, said inner and outer conductors being constructed of different materials having higher and lower critical magnetic field values respectively, means for maintaining the inner and outer conductors at a temperature below the transition temperature thereof, means for insulating the conductors from each other at the operating temperature thereof, and means for establishing a control current through at least one of the conductors to vary the surrounding magnetic field whereby at least one other of the conductors is selectively switched between a superconductive state and a resistive state.

22. A circuit element including the combination of an inner conductor constructed of a material having a particular value of critical magnetic field for which a conductor may be switched from the superconductive to the resistive state, an outer conductor which is coaxially disposed with respect to the inner conductor and constructed of a material which has a lower value of critical magnetic field, means for maintaining the inner and outer conductors at an operating temperature below the transition temperatures of said conductors, and means for establishing a control current through the inner conductor to vary the surrounding magnetic field whereby the outer conductor is selectively switched between a superconductive state and a resistive state.

23. A circuit element including the combination of a central control wire which is superconductive for current therethrough up to a critical current value, a tubular conductor coaxially disposed with respect to the control wire and superconductive below a particular transition temperature, said control wire and said tubular conductor being constructed of different materials having higher and lower critical magnetic field values respectively, and means for varying the current flow through the control wire within a range less than said critical current value to vary the surrounding magnetic field whereby the tubular conductor is selectively switched between a superconductive state and a resistive state.

24. A gating device comprising first, second, and third conductors disposed in parallel spaced relationship; said second conductor being arranged within said first conductor; said third conductor being arranged within said second conductor; said conductors being fabricated of superconductor material and maintained at an operating temperature at which each is in a superconductive state in the absence of a magnetic field; input means for said device comprising means connected to longitudinally spaced points on said third conductor for producing longitudinal current therein and thereby generating a magnetic field in the vicinity of said first conductor; said magnetic field produced by the longitudinal current in said third conductor being less than the critical field required to drive said first conductor from a superconductive to a resistive state; output circuit means for said device connected to longitudinally spaced points on said first conductor; and further circuit means connected to longitudinally spaced points on said second conductor for controlling the effect of said magnetic field produced by said current in said third conductor on said first conductor.

25. The device of claim 24 wherein each of said conductors is cylindrical; said cylindrical conductors being arranged coaxially with said second cylinders having a radius less than that of said first cylinder, and said third cylinder having a radius less than that of said second cylinder.

26. The device of claim 24 wherein said further circuit means comprises means for producing longitudinal current in said second conductor and thereby generating a magnetic field adjacent said first conductor; the magnetic fields generated by currents in said third and second conductors being in the same direction and, together, being sufficient to cause said first conductor to be driven into a resistive state but each of said fields alone being insufficient to cause said first conductor to be driven from a superconductive to a resistive state.

27. The circuit of claim 26 wherein said output circuit means connected to said first conductor comprises means for producing a current in said first conductor in a direction to generate a magnetic field in opposition to the fields generated by current in said second and third conductors.

28. A gating device comprising first, second and third coaxially arranged cylindrical conductors; said second cylindrical conductor having a radius smaller than that of said first cylindrical conductor and arranged within said first cylindrical conductor; said third cylindrical conductor having a radius smaller than that of said second cylindrical conductor and arranged within said second cylindrical conductor; said first and second cylindrical conductors being fabricated of a superconductor material and each being maintained at a temperature below that at which it undergoes transitions between resistive and superconductive materials in the absence of a magnetic field; means connected to said third cylindrical conductor for applying thereto signals effective to generate a magnetic field in the vicinity of said first cylindrical conductor; output means including said first cylindrical conductor for manifesting an output in response to said magnetic field; and means connected to said second cylindrical conductor for controlling the output response of said first cylindrical conductor to said magnetic field.

29. A switching device comprising a gate conductor, a bias conductor; a control conductor; each of said conductors being fabricated of superconductive material and maintained at a temperature below its transition temperature; means for supplying bias current to said bias conductor to cause said gate conductor to be subjected to a biasing magnetic field; means for supplying gate current to said gate conductor in a direction such that it generates a magnetic field opposing said biasing magnetic field; means for supplying to said control conductor current in a direction such that it generates a magnetic field aiding said biasing magnetic field; whereby the current required in said gate conductor to cause the gate conductor to be driven resistive when there is bias current in said bias conductor is greater than the current required in said control conductor to cause the gate conductor to be driven resistive when there is bias current in said bias conductor; and in which device said gate, bias, and control conductors are cylindrical conductors of successively smaller radius and said bias and control conductors are arranged within said gate conductor.

30. A switching device comprising a gate and a control conductor means of superconductor material maintained at a temperature at which each is superconductive in the absence of a magnetic field; means connected to said gate conductor means for producing longitudinal current therein; said longitudinal current producing a magnetic field only at one surface of said gate conductor means; said control conductor means arranged adjacent the other surface of said gate conductor means for applying thereto magnetic fields effective to control the state, superconductive or normal, of said gate conductor means regardless of the presence or absence of current therein; wherein said gate conductor means comprises a first cylindrical conductor; and said control conductor means comprises second and third cylindrical conductors; said cylindrical conductors being coaxial and said first cylindrical conductor having a radius greater than that of said second and third cylindrical conductors and arranged around said second and third cylindrical conductors.

31. In a superconductor gating device; first, second, and third superconductor cylindrical conductors; said second cylindrical conductor being arranged within said first cylindrical conductor and said third cylindrical conductor being arranged within said second cylindrical conductor; means connected to said cylindrical conductors for supplying a longitudinal current in a first direction to said first cylindrical conductor and a longitudinal current in a second direction to said second and third cylindrical conductors; whereby the state of said first cylindrical conductor, superconductive or normal, is controlled by the magnetic fields produced by said currents in said same direction in said second and third cylindrical conductors.

32. A switching device comprising a gate conductor; a control conductor; a further conductor; said conductors being fabricated of superconductor material and maintained at an operating temperature at which each is in a superconductive state; means connected to said conductors for producing currents in said gate conductor in a first direction and in said control and further conductors in a direction opposite to said first direction;

whereby magnetic fields applied to said gate conductor due to said current in said control conductor are in a direction opposite that of magnetic fields applied to said gate conductor due to said current in said gate conductor; and magnetic fields applied to said gate conductor due to said current in said further conductor are in the same direction as magnetic fields applied to said gate conductor due to said current in said control conductor; and in which device said control and further conductors are arranged within said gate conductor.

33. A cryotron comprising an elongated controlled element having superconductive characteristics whch can be affected by a magnetic field, means for passing current through said controlled element, an elongated controlling element that is parallel to said controlled element and that is shaped and positioned so that a current through only said controlling element will produce a magnetic field in the region of said controlled element, means for passing a second current through said controlling element and not said controlled element, an elongated biasing element that is parallel to said controlled and controlling elements and that is shaped and positioned so that a current through only said biasing element will produce a magnetic field in the region of said controlled element, means for passing a third current through said biasing element and not said controlled element, and means for causing the direction of said third current to be opposite to the direction of said current in said controlled element.

References Cited

UNITED STATES PATENTS

| | | | |
|---|---|---|---|
| 2,666,884 | 1/1954 | Ericsson et al. | 307—88.5 X |
| 2,832,897 | 4/1958 | Buck | 307—88.5 X |

OTHER REFERENCES

Solid State Circuits Conference, 1959, "Proposed New Cryotron Geometry and Circuits" by R. K. Richards, p. 30, copyright 1959.

Official Gazette of the U.S. Patent Office, vol. 839, No. 3, June 20, 1967, pp. 830–841.

JOHN S. HEYMAN, *Primary Examiner.*

U.S. Cl. X.R.

307—245; 338—32